(12) United States Patent
Marushima et al.

(10) Patent No.: US 6,491,495 B1
(45) Date of Patent: Dec. 10, 2002

(54) CLOSED CIRCUIT BLADE-COOLED TURBINE

(75) Inventors: Shinya Marushima, Hitachinaka (JP); Shunichi Anzai, Hitachi (JP); Masami Noda, Hitachinaka (JP); Manabu Matsumoto, Ibaraki (JP); Nobuaki Kizuka, Hitachinaka (JP); Tsuyoshi Takano, Hitachi (JP)

(73) Assignee: Hitachi Ltd., Tokyo (JP)

( * ) Notice: Subject to any disclaimer, the term of this patent is extended or adjusted under 35 U.S.C. 154(b) by 0 days.

(21) Appl. No.: 09/644,058

(22) Filed: Aug. 23, 2000

(30) Foreign Application Priority Data

Mar. 2, 2000 (JP) ........................................ 2000-057192

(51) Int. Cl.$^7$ ................................................ F02C 7/18
(52) U.S. Cl. .................. 416/96 R; 415/114; 416/201 R
(58) Field of Search ................................. 416/95, 96 R, 416/198 R, 201 R, 201 A; 415/114, 115, 175, 116, 117

(56) References Cited

U.S. PATENT DOCUMENTS

| | | | | |
|---|---|---|---|---|
| 1,657,192 A | * | 1/1928 | Belluzzo | 416/96 R |
| 2,906,494 A | * | 9/1959 | McCarty et al. | 416/96 R |
| 2,974,925 A | * | 3/1961 | Freche et al. | 416/95 X |
| 2,977,089 A | * | 3/1961 | McCarty et al. | 416/96 R |
| 2,977,090 A | * | 3/1961 | McCarty et al. | 416/96 R |
| 3,550,372 A | * | 12/1970 | Craig | 416/95 X |
| 3,575,528 A | * | 4/1971 | Beam, Jr. et al. | 416/95 X |
| 5,593,274 A | * | 1/1997 | Carreno et al. | 415/115 |
| 5,695,319 A | * | 12/1997 | Matsumoto et al. | 416/95 |
| 5,755,556 A | * | 5/1998 | Hultgren et al. | 416/96 R |
| 5,782,076 A | * | 7/1998 | Huber et al. | 415/115 X |
| 5,795,130 A | * | 8/1998 | Suenaga et al. | 416/95 |
| 5,984,637 A | * | 11/1999 | Matsuo | 416/97 R |
| 6,007,299 A | * | 12/1999 | Uematsu | 416/96 R |
| 6,053,701 A | * | 4/2000 | Ichiryu et al. | 416/96 R |
| 6,334,756 B1 | * | 1/2002 | Akiyama et al. | 415/116 |

FOREIGN PATENT DOCUMENTS

| | | |
|---|---|---|
| JP | 7-189740 | 7/1995 |
| JP | 9-242563 | 9/1997 |

* cited by examiner

*Primary Examiner*—John E. Ryznic
(74) *Attorney, Agent, or Firm*—Mattingly, Stanger & Malur, P.C.

(57) ABSTRACT

In a closed circuit moving blade cooled turbine, holes in the radial direction formed in the outer periphery of a second stage wheel are led to cooling air supply holes to second stage moving blades and to prevent the cooling air from leaking into the junction, the holes in the radial direction and the cooling air supply holes are interconnected and the supply members covering the junction are fit into them. The cooling air after cooling the second stage moving blades is introduced into the collection holes formed in the outer periphery of the spacer via the cooling air collection holes and to prevent the cooling air from leaking into the boundary, the cooling air collection holes and collection holes are interconnected and the collection members covering the boundary are fit into them. To make the sum of minimum sectional areas of the respective paths of the second stage moving blades smaller than the sum of minimum sectional areas of the respective paths of the first stage moving blades, a minimum sectional member is incorporated into the supply member.

8 Claims, 8 Drawing Sheets ns are easily caused to each product and after assembly and manufacture, when the metal temperature of each of the first stage moving blades and second stage moving blades is deviated from the design value, it is necessary to adjust the flow rate distribution of a refrigerant to be supplied depending on the metal temperature of each of the first stage moving blades and second stage moving blades.

CLOSED CIRCUIT BLADE-COOLED TURBINE

BACKGROUND OF THE INVENTION

The present invention relates to a closed circuit blade cooled turbine for improving the performance of gas turbine equipment by supplying a refrigerant inside the moving blades of a turbine, circulating and collecting it.

A conventional turbine moving blade cooling system is generally a closed circuit blade cooling system for warming or cooling a wheel which is a holding member of the moving blades first by introducing air extracted from an optional stage of a multistage compressor to a rotor which is a multistage turbine group, moderates the temperature gradient generated in the wheel, and then cooling and lowering the moving blade metal temperature by supplying and circulating air inside the moving blades, and discharging air after cooling into the gas flow path of the turbine as it is.

However, recently in gas turbine equipment, for the purpose of energy conservation and environmental maintenance, realization of high efficiency of a system has been required. As a means of realization of high efficiency, a closed circuit blade cooling system is used, which system has a constitution that a cooling medium (hereinafter referred to as a refrigerant) after cooling of the moving blades is all collected without discharging it into the turbine gas flow path as exhaust gas as it is and returned between the compressor and the combustor via the return line.

Thereby, not only the loss extracted from the compressor as a refrigerant is recirculated and made up but also the thermal energy received by turbine cooling is added to gas before combustion and hence a constitution that high efficiency improvement is available is realized.

Such a closed circuit blade cooling system or turbine is described in, for example, Japanese Patent Application Laid-Open 7-189740 and Japanese Patent Application Laid-Open 9-242563.

Meanwhile, in the closed circuit blade cooling turbine, a refrigerant to be supplied from the still side is generally supplied to the rotor via a single supply path without distinction of a refrigerant for the first stage moving blades (moving blades positioned on the uppermost stream side of main gas of the gas turbine) and a refrigerant for the second stage moving blades (moving blades positioned on the downstream side of the first stage moving blades) and also when the refrigerant is to be collected on the still side from the rotor after cooling each moving blade, it is collected via a single collection path without distinction of the refrigerant for the first stage moving blades and the refrigerant for the second stage moving blades. Therefore, the branch point of a refrigerant to be supplied to the first stage moving blades and the second stage moving blades and the junction of a refrigerant to be collected from the first stage moving blades and the second stage moving blades are located inside the rotor. Between the branch point and the junction in the rotor, a refrigerant supply flow path and a refrigerant collection flow path for the first stage moving blades and a refrigerant supply flow path and a refrigerant collection flow path for the second stage moving blades are installed and these flow paths have a plurality of parallel flow paths for refrigerant supply and a plurality of parallel flow paths for refrigerant collection which are connected to the respective refrigerant paths in the moving blades at each stage.

However, there are the following problems imposed in a conventional closed circuit blade cooling turbine.

Since main gas passing through the second stage moving blades does its work in the first stage moving blades, the temperature of main gas in the second stage moving blades is lower than that of the first stage moving blades. When the temperature of main gas at the outlet of the combustor is on the level of 1500° C., the difference in the temperature of main gas between the first stage moving blades and the second stage moving blades is more than 200° C. Even if the allowable metal temperature of the first stage moving blades is made higher than that of the second stage moving blades depending on the material characteristics such as the material kind, single crystal, polycrystal, and others, it is impossible to compensate for more than 200° C. of difference in the temperature of main gas by the material and hence it is necessary that the first stage moving blades supply and cool a refrigerant at a flow rate higher than that of the second stage moving blades.

Inside the rotor, as mentioned above, the refrigerant flow path (refrigerant supply flow path and refrigerant collection flow path) for the first stage moving blades and the refrigerant flow path (refrigerant supply flow path and refrigerant collection flow path) for the second stage moving blades are installed. In this case, assuming that the flow resistance of the refrigerant flow path for the first stage moving blades and the flow resistance of the refrigerant flow path for the second stage moving blades in the moving blades and rotor are equal to each other, a refrigerant in the same amount flows through the first stage moving blades and second stage moving blades respectively.

However, by doing this, as mentioned above, an appropriate refrigerant flow rate cannot be distributed in the first stage moving blades and second stage moving blades which are different in the necessary refrigerant flow rate. Namely, if a necessary amount of refrigerant is supplied to the first stage moving blades, an excessive amount of refrigerant flows through the second stage moving blades and the thermal effect of the turbine is reduced. Inversely, if a necessary amount of refrigerant is supplied to the second stage moving blades, the refrigerant of the first stage moving blades is insufficient and the first stage moving blades exceed the allowable metal temperature.

On the basis of the aforementioned respects, even if the sectional area and resistance of the refrigerant supply flow path in each of the rotor and moving blades are estimated at the design stage and each refrigerant flow path is designed and manufactured on the basis of it so that an appropriate flow rate flows in the moving blades at each stage, actually variations are easily caused to each product and after assembly and manufacture, when the metal temperature of each of the first stage moving blades and second stage moving blades is deviated from the design value, it is necessary to adjust the flow rate distribution of a refrigerant to be supplied depending on the metal temperature of each of the first stage moving blades and second stage moving blades.

A refrigerant supplied to the rotor via the single supply path is branched to a refrigerant for the first stage moving blades and a refrigerant for the second stage moving blades in the rotor and the refrigerants after cooling the first stage moving blades and second stage moving blades join in the rotor and are collected outside the rotor via the single collection path. Therefore, it is necessary to adjust the refrigerant flow rate of each of the first stage moving blades and second stage moving blades and in this case, it is necessary to consider at what position of the refrigerant flow path the flow path resistance for flow rate adjustment is to be set.

In the general constitution of the rotor that the rotor is locked with bolts with a plurality of wheels and spacers overlapped in the axial direction, when a flow path resistor is installed inside the rotor, whenever the flow rate for the moving blades at each stage is to be adjusted, it is necessary to remove the locking bolts of the rotor and break down it and hence the operation is complicated extremely and the operation time and cost are increased. Therefore, it is a problem how to adjust the flow rate simply without breaking down the rotor.

SUMMARY OF THE INVENTION

An object of the present invention is to provide a closed circuit blade cooled turbine in which a refrigerant can be supplied to and collected from each of first stage moving blades and second stage moving blades having a necessary high refrigerant flow rate at an appropriate flow rate distribution.

Another object of the present invention is to provide a closed circuit blade cooling turbine in which a refrigerant flow rate to the moving blades at each stage can be simply adjusted without disassembling the rotor.

(1) To accomplish the above first object, the present invention provides a closed circuit blade cooling turbine having moving blades at a plurality of stages arranged in the flowing direction of main gas of a gas turbine and fixed to the outer periphery of a rotor, supplying a refrigerant at least to the first stage and second stage moving blades from the upstream side among the moving blades at the plurality of stages, and collecting the refrigerant after cooling without discharging it into main gas, wherein the turbine, inside the rotor, has a branch point of the refrigerant supply path for the first stage moving blades and the refrigerant supply path for the second stage moving blades and a junction of the refrigerant collection path for the first stage moving blades and the refrigerant collection path for the second stage moving blades, and the refrigerant supply path and refrigerant collection path for the first stage moving blades and the refrigerant supply path and refrigerant collection path for the second stage moving blades have a plurality of parallel flow paths for refrigerant supply and a plurality of parallel flow paths for refrigerant collection to be connected to the respective refrigerant paths in the moving blades at each stage between the branch point and the junction, and the sum of minimum sectional areas of any parts of the plurality of parallel flow paths for refrigerant supply for the second stage moving blades and the plurality of parallel flow paths for refrigerant collection and the respective refrigerant flow paths in the second stage moving blades is smaller than the sum of minimum sectional areas of any parts of the plurality of parallel flow paths for refrigerant supply for the first stage moving blades and the plurality of parallel flow paths for refrigerant collection and the respective refrigerant flow paths in the first stage moving blades.

Thereby, for the first stage moving blades and second stage moving blades which are greatly different in the necessary refrigerant flow rate, a refrigerant can be supplied and collected respectively at an appropriate refrigerant flow rate distribution.

(2) To accomplish the above first object, the present invention provides a closed circuit blade cooling turbine having the refrigerant supply flow path and refrigerant collection path for the first stage moving blades, the refrigerant supply flow path and refrigerant collection path for the second stage moving blades, and a plurality of parallel flow paths for refrigerant supply and a plurality of parallel flow paths for refrigerant collection between the branch point and the junction, wherein at any part of the plurality of parallel flow paths for refrigerant supply for the first stage moving blades, the plurality of parallel flow paths for refrigerant collection, and the respective refrigerant flow paths in the first stage moving blades, the first metal fittings having an internal flow path are arranged, and at any part of the plurality of parallel flow paths for refrigerant supply for the second stage moving blades, the plurality of parallel flow paths for refrigerant collection, and the respective refrigerant flow paths in the second stage moving blades, the second metal fittings having an internal flow path are arranged, and the sum of sectional areas of the internal flow paths of the second metal fittings is smaller than the sum of sectional areas of the internal flow paths of the first metal fittings.

Thereby, for the first stage moving blades and second stage moving blades which are greatly different in the necessary refrigerant flow rate, a refrigerant can be supplied and collected respectively at an appropriate refrigerant flow rate distribution.

(3) To accomplish the above first object, the present invention provides a closed circuit blade cooling turbine having the refrigerant supply flow path and refrigerant collection path for the first stage moving blades, the refrigerant supply flow path and refrigerant collection path for the second stage moving blades, and a plurality of parallel flow paths for refrigerant supply and a plurality of parallel flow paths for refrigerant collection between the branch point and the junction, wherein at any part of the plurality of parallel flow paths for refrigerant supply for the second stage moving blades, the plurality of parallel flow paths for refrigerant collection, and the respective refrigerant flow paths in the second stage moving blades, a means for adjusting the internal flow resistance is installed.

Also thereby, for the first stage moving blades and second stage moving blades which are greatly different in the necessary refrigerant flow rate, a refrigerant can be supplied and collected respectively at an appropriate refrigerant flow rate distribution.

(4) Furthermore, to accomplish the above first object, the present invention provides a closed circuit blade cooling turbine having the refrigerant supply flow path and refrigerant collection path for the first stage moving blades, the refrigerant supply flow path and refrigerant collection path for the second stage moving blades, and a plurality of parallel flow paths for refrigerant supply and a plurality of parallel flow paths for refrigerant collection between the branch point and the junction, wherein at any part of the plurality of parallel flow paths for refrigerant supply for the second stage moving blades, the plurality of parallel flow paths for refrigerant collection, and the respective refrigerant flow paths in the second stage moving blades, the third metal fittings having an internal flow path are arranged and the third metal fittings have a means for adjusting the internal flow resistance.

Also thereby, for the first stage moving blades and second stage moving blades which are greatly different in the necessary refrigerant flow rate, a refrigerant can be supplied and collected respectively at an appropriate refrigerant flow rate distribution.

(5) To accomplish the above first and second objects, the present invention provides a closed circuit blade cooling turbine having the refrigerant supply flow path and refrigerant collection path for the first stage moving blades, the refrigerant supply flow path and refrigerant collection path for the second stage moving blades, and a plurality of parallel flow paths for refrigerant supply and a plurality of parallel flow paths for refrigerant collection between the branch point and the junction, wherein the sum of minimum sectional areas of any parts in the neighborhood of the connections of the plurality of parallel flow paths for refrigerant supply for the second stage moving blades and the respective refrigerant flow paths in the second stage moving blades and in the neighborhood of the connections of the plurality of parallel flow paths for refrigerant collection for the second stage moving blades and the respective refrigerant flow paths in the second stage moving blades is smaller than the sum of minimum sectional areas of any parts in he neighborhood of the connections of the plurality of parallel flow paths for refrigerant supply for the first stage moving blades and the respective refrigerant flow paths in the first stage moving blades and in the neighborhood of the connections of the plurality of parallel flow paths for refrigerant collection for the first stage moving blades and the respective refrigerant flow paths in the first stage moving blades.

Thereby, for the first stage moving blades and second stage moving blades which are greatly different in the necessary refrigerant flow rate, a refrigerant can be supplied and collected respectively at an appropriate refrigerant flow rate distribution and the refrigerant flow rate to the moving blades at each stage can be adjusted simply without breaking down the rotor.

(6) To accomplish the above first and second objects, the present invention provides a closed circuit blade cooling turbine having the refrigerant supply flow path and refrigerant collection path for the first stage moving blades, the refrigerant supply flow path and refrigerant collection path for the second stage moving blades, and a plurality of parallel flow paths for refrigerant supply and a plurality of parallel flow paths for refrigerant collection between the branch point and the junction, wherein at any parts in the neighborhood of the connections of the plurality of parallel flow paths for refrigerant supply for the first stage moving blades and the respective refrigerant flow paths in the first stage moving blades and in the neighborhood of the connections of the plurality of parallel flow paths for refrigerant collection for the first stage moving blades and the respective refrigerant flow paths in the first stage moving blades, the first metal fittings having an internal flow path are arranged, and at any parts in the neighborhood of the connections of the plurality of parallel flow paths for refrigerant supply for the second stage moving blades and the respective refrigerant flow paths in the second stage moving blades and in the neighborhood of the connections of the plurality of parallel flow paths for refrigerant collection for the second stage moving blades and the respective refrigerant flow paths in the second stage moving blades, the second metal fittings having an internal flow path are arranged, and the sum of sectional areas of the internal flow paths of the second metal fittings is smaller than the sum of sectional areas of the internal flow paths of the first metal fittings.

Also thereby, for the first stage moving blades and second stage moving blades which are greatly different in the necessary refrigerant flow rate, a refrigerant can be supplied and collected respectively at an appropriate refrigerant flow rate distribution and the refrigerant flow rate to the moving blades at each stage can be adjusted simply without breaking down the rotor.

(7) Furthermore, to accomplish the above first and second objects, the present invention provides a closed circuit blade cooling turbine having the refrigerant supply flow path and refrigerant collection path for the first stage moving blades, the refrigerant supply flow path and refrigerant collection path for the second stage moving blades, and a plurality of parallel flow paths for refrigerant supply and a plurality of parallel flow paths for refrigerant collection between the branch point and the junction, wherein at any part in the neighborhood of the connections of the plurality of parallel flow paths for refrigerant supply for the second stage moving blades and the respective refrigerant flow paths in the second stage moving blades and in the neighborhood of the connections of the plurality of parallel flow paths for refrigerant collection for the second stage moving blades and the respective refrigerant flow paths in the second stage moving blades, a means for adjusting the internal flow resistance is installed.

Also thereby, for the first stage moving blades and second stage moving blades which are greatly different in the necessary refrigerant flow rate, a refrigerant can be supplied and collected respectively at an appropriate refrigerant flow rate distribution and the refrigerant flow rate to the moving blades at each stage can be adjusted simply without breaking down the rotor.

(8) To accomplish the above first and second objects, the present invention provides a closed circuit blade cooling turbine having the refrigerant supply flow path and refrigerant collection path for the first stage moving blades, the refrigerant supply flow path and refrigerant collection path for the second stage moving blades, and a plurality of parallel flow paths for refrigerant supply and a plurality of parallel flow paths for refrigerant collection between the branch point and the junction, wherein at any part in the neighborhood of the connections of the plurality of parallel flow paths for refrigerant supply for the second stage moving blades and the respective refrigerant flow paths in the second stage moving blades and in the neighborhood of the connections of the plurality of parallel flow paths for refrigerant collection for the second stage moving blades and the respective refrigerant flow paths in the second stage moving blades, the third metal fittings having an internal flow path are arranged and the third metal fittings have a means for adjusting the internal flow resistance.

Also thereby, for the first stage moving blades and second stage moving blades which are greatly different in the necessary refrigerant flow rate, a refrigerant can be supplied and collected respectively at an appropriate refrigerant flow rate distribution and the refrigerant flow rate to the moving blades at each stage can be adjusted simply without breaking down the rotor.

(9) In (2), (4), (6) and (8) mentioned above, the first and second metal fittings or the third metal fittings are preferably supply members or collection members which are installed so as to prevent a refrigerant from leaking from the rotor and the gap between the first stage moving blades and the second stage moving blades.

Thereby, using the supply members or collection members installed so as to prevent a refrigerant from leaking, the refrigerant flow rate can be adjusted.

(10) In (1) to (8) mentioned above, furthermore, in the refrigerant flow path at least on one of the still side which is a supply source of the aforementioned refrigerant and the still side which is a collection destination of the aforementioned refrigerant, a means for adjusting the flow resistance is installed.

By doing this, a large adjustment margin of the refrigerant flow rate of not only the second stage moving blades but also the first stage moving blades can be obtained.

(11) To accomplish the above first object, the present invention provides a closed circuit blade cooling turbine having, inside the rotor, a branch point of the refrigerant supply path for the first stage moving blades and the refrigerant supply path for the second stage moving blades and a junction of the refrigerant collection path for the first stage moving blades and the refrigerant collection path for the second stage moving blades, wherein so that the pressure loss generated in the refrigerant flow path and refrigerant collection flow path for the second stage moving blades can be made larger than the pressure loss generated in the refrigerant flow path and refrigerant collection flow path for the first stage moving blades, the respective flow paths are formed.

Also by doing this, for the first stage moving blades and second stage moving blades which are greatly different in the necessary refrigerant flow rate, a refrigerant can be supplied and collected respectively at an appropriate refrigerant flow rate distribution.

DESCRIPTION OF EMBODIMENTS OF THE INVENTION

The embodiments of the present invention will be explained in detail hereunder with reference to the accompanying drawings.

Figure 1:
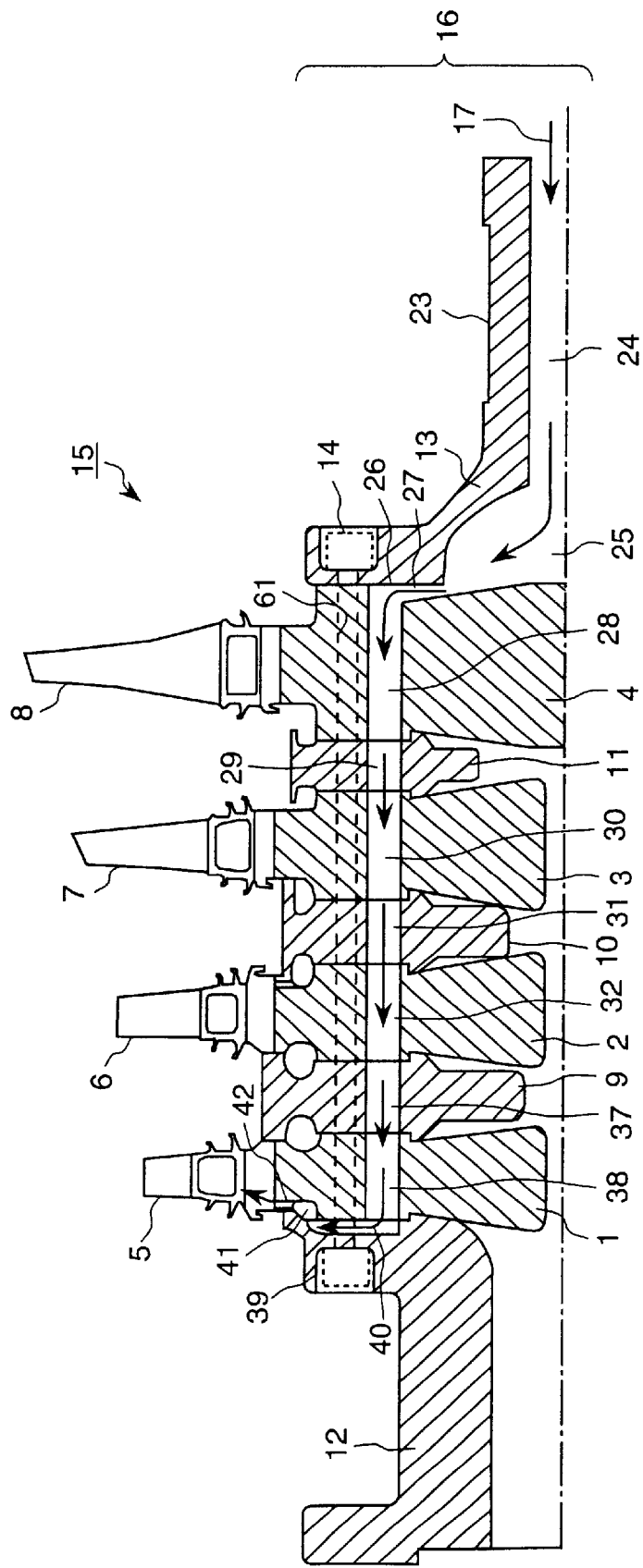
FIG. 1 is a view showing a half of the section in the direction of the turbine shaft showing the supply path of cooling air to the first stage moving blades.

FIG. 1 is a view showing a half of the section in the axial direction of the turbine showing the supply path of cooling air to the first stage moving blades in a closed circuit blade cooling turbine of this embodiment. In this Figure, a rotor 16 is composed of a first stage wheel 1, a second stage wheel 2, a third stage wheel 3, a fourth stage wheel 4, spacers 9, 10, and 11 which are clamped by the sides of the respective wheels, a distant piece 12 connected to the side of a compressor, and a stub shaft 13 joined to the side of the fourth stage wheel 4 and the distant piece 12, the first stage wheel 1 to the fourth stage wheel 4, the spacers 9, 10, and 11 positioned between them, and the stub shaft 13 are strongly connected by stacking bolts 14 via through holes 18 formed in the joined surfaces of each wheel and each spacer. In the outer peripheries of the wheels 1, 2, 3, and 4 at the respective stages, first stage moving blades 5, second stage moving blades 6, third stage moving blades 7, and fourth stage moving blades 8 are held and the whole constitutes a turbine 15. Main gas flows in the direction from the first stage moving blades 5 to the fourth stage moving blades 8 (in the direction from the left to the right in the Figure).

Firstly, the cooling air supply path to the first stage moving blades 5 will be explained. Cooling air 17 is supplied from the still side of the body not shown in the drawing via the inside of a bearing part 23 of the stub shaft, that is, a center hole 24 of the stub shaft and led into a cavity 25 formed by the stub shaft 13 and the fourth stage wheel 4. The cooling air 17 led into the cavity 25, via a slit 27 provided in a junction surface 26 of the fourth stage wheel 4 and the stub shaft 13 in the radial direction, reaches a supply hole 28 passing through the fourth stage wheel 4 in the shaft direction from the junction surface 26, a supply hole 29 passing through the spacer 11, a supply hole 30 passing through the third stage wheel 3, and a supply hole 31 passing through the spacer 10. The cooling air 17 passing through the supply hole 31 is supplied to a supply hole 32 passing through the second stage wheel 2. The cooling air 17 passing through the supply hole 32 passing through the second stage wheel 2 is supplied to a slit 40 provided in a junction surface 39 of the first stage wheel 1 and the distant piece 12 in the radial direction via a supply hole 37 passing through the spacer 9 and a supply hole 38 passing through the first stage wheel 1. The cooling air 17 supplied to the slit 40 reaches a cavity 41 located in the circular flow path on the same shaft as that of the rotor which is formed by the first stage wheel 1 and the distant piece 12 and joins once and then is supplied to the respective first stage moving blades 5 via a hole 42 in the radial direction provided on the outer periphery side of the first stage wheel as a parallel flow path for refrigerant supply to the respective first stage moving blades 5.

Figure 2:
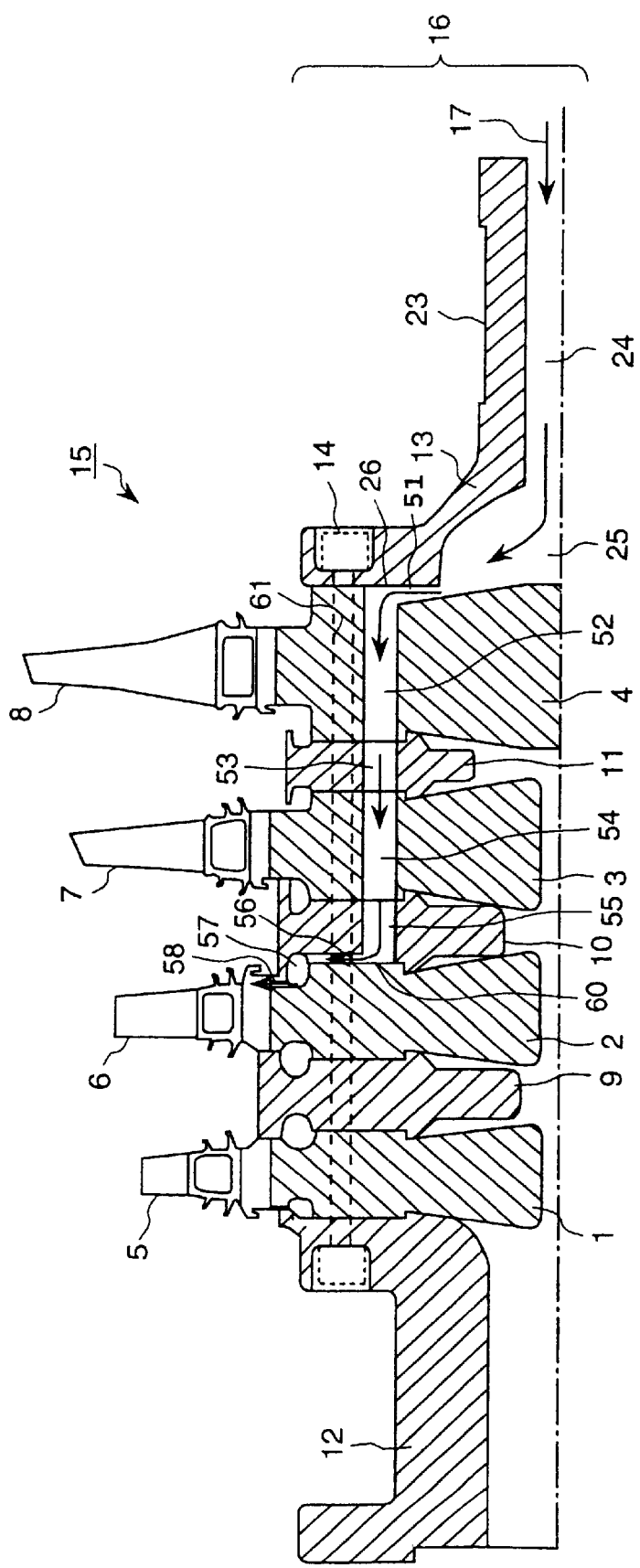
FIG. 2 is a view showing a half of the section in the direction of the turbine shaft showing the supply path of cooling air to the second stage moving blades.

Next, FIG. 2 is a view showing a half of the section in the direction of the turbine shaft showing the supply path of cooling air to the second stage moving blades and the cooling air supply path to the second stage moving blades 6 will be explained hereunder by referring to the drawing. The cooling air 17, in the same way as with the case of the first stage moving blades 5, is supplied from the still side of the body not shown in the drawing via the inside of the bearing part 23 of the stub shaft 13, that is, the center hole 24 of the stub shaft and led into the cavity 25 formed by the stub shaft 13 and the fourth stage wheel 4. The cooling air 17 led into the cavity 25, via a slit 51 provided in the junction surface 26 of the fourth stage wheel 4 and the stub shaft 13 in the radial direction, reaches a supply hole 52 passing through the fourth stage wheel 4 in the shaft direction from the junction surface 26, a supply hole 53 passing through the spacer 11, a supply hole 54 passing through the third stage wheel 3, and a supply hole 55 passing through the spacer 10. The cooling air 17 passing through the supply hole 55 is supplied to a slit 56 provided in a junction surface 60 of the second stage wheel 2 and the spacer 10. The cooling air 17 supplied to the slit 56 reaches a cavity 57 located in the circular flow path on the same shaft as that of the rotor which is formed by the second stage wheel 2 and the spacer 10 and joins once and then is supplied to the respective second stage moving blades 6 via a hole 58 in the radial direction provided on the outer periphery side of the second stage wheel as a parallel flow path for refrigerant supply to the respective second stage moving blades 6.

Figure 3:
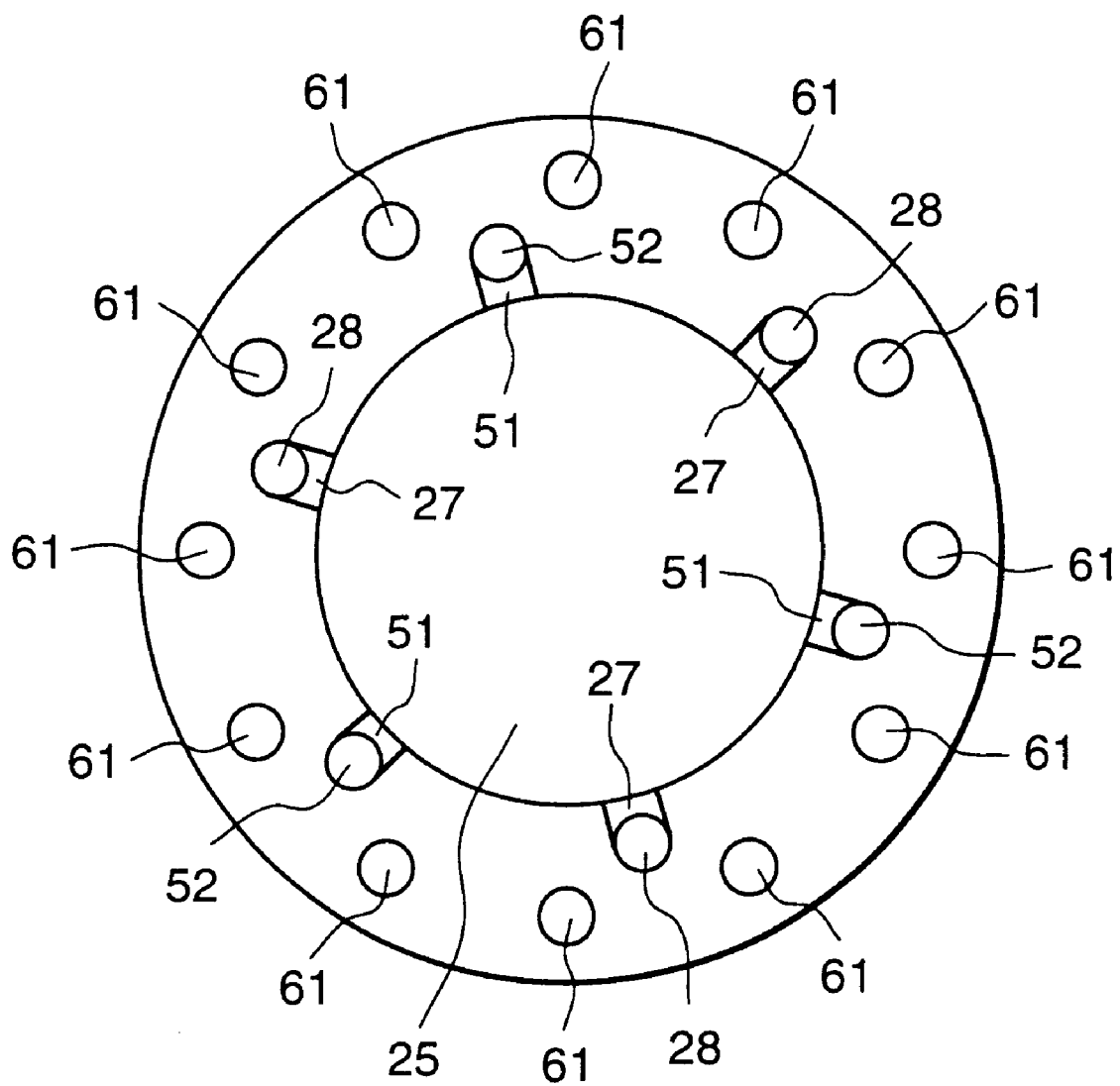
FIG. 3 is a view showing the junction surface of the fourth stage wheel facing a stub shaft.

The junction surface 26 of the fourth stage wheel 4 facing the stub shaft 13 is shown in FIG. 3. In the outer periphery, there are bolt holes 66 into which stacking bolts are inserted at twelve even intervals in the peripheral direction. On the inner periphery side thereof, there are slits 27 and supply holes 28 arranged at three even intervals in the peripheral direction through which cooling air for the first stage moving blades passes and furthermore, at the same radial position, there are slits 51 and supply holes 52 arranged at three even intervals in the peripheral direction through which cooling air for the second stage moving blades passes. According to this embodiment, the cooling air 17 supplied to the rotor 16 is branched from the cavity 25 in the rotor 16 to cooling air for the first stage moving blades passing through the slits 27 and cooling air for the second stage moving blades passing through the slits 51 and in other words, the branch point of the two cooling air flow paths in the rotor 16 is the cavity 25.

Figure 4:
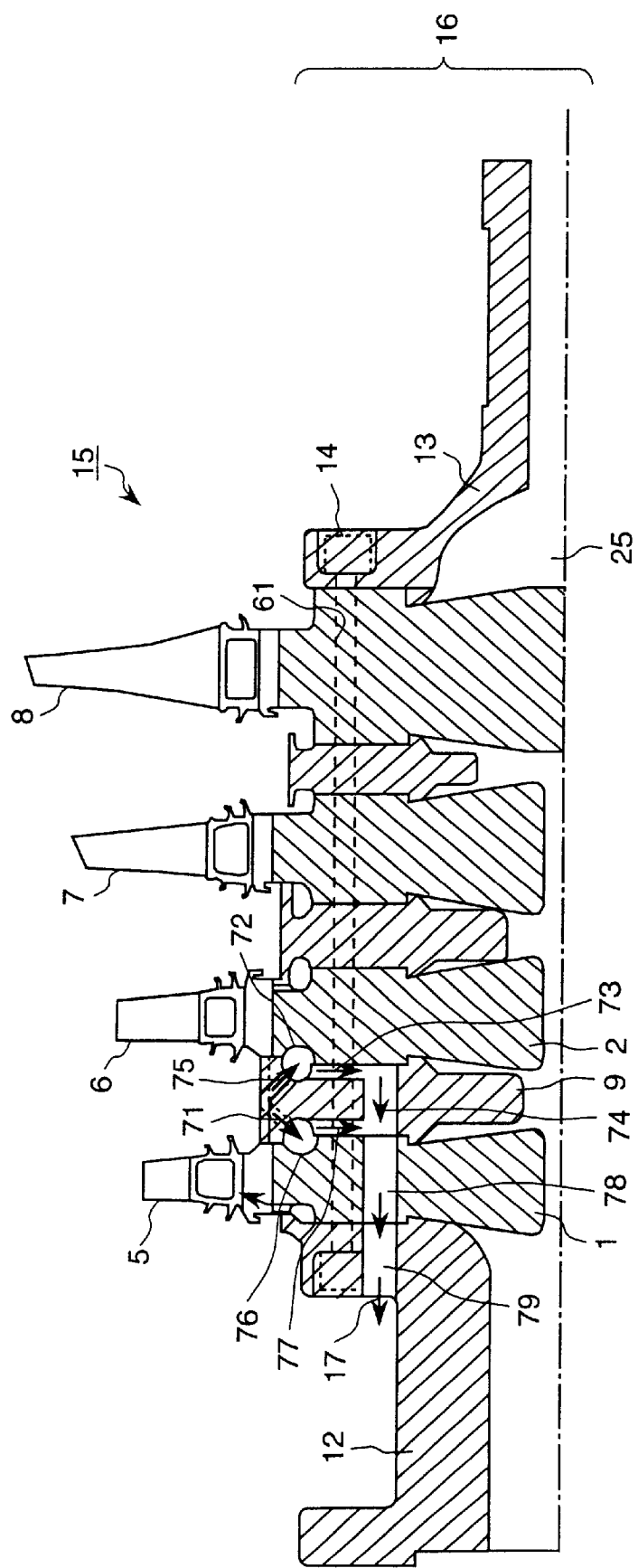
FIG. 4 is a view showing a half of the section in the direction of the turbine shaft showing the collection path of cooling air from the first stage moving blades and the second stage moving blades.

Next, FIG. 4 is a view showing a half of the section in the axial direction of the turbine showing the collection paths of the cooling air 17 from the first stage moving blades 5 and the second stage moving blades 6 and the collection paths of the cooling air 17 from the moving blades 5 and 6 at the respective stages will be explained by referring to the drawing. The cooling air 17 collected from the respective first stage moving blades 5 reaches a cavity 72 located in the circular flow path on the same shaft as that of the rotor which is formed by the spacer 9 and the second stage wheel 2 via a collection hole 75 installed in the outer periphery of the spacer 9 as a parallel flow path for refrigerant collection. The cooling air 17 flowing into the cavity 72 is introduced into a collection hole 74 formed in the spacer 9 via a slit 73.

On the other hand, the cooling air 17 collected from the respective second stage moving blades 6 reaches a cavity 76 located in the circular flow path on the same shaft as that of the rotor which is formed by the spacer 9 and the first stage wheel 1 via a collection hole 71 installed in the outer periphery of the spacer 9 as a parallel flow path for refrigerant collection. The cooling air 17 flowing into the cavity 76 joins collection air of the first stage moving blades 5 passing through the collection hole 74 via a slit 77. In other words, the junction of the two cooling air flow paths 17 in the rotor 16 is the outlet of the collection hole 74. The cooling air after joining is exhausted outside the rotor 16 via a collection hole 78 formed in the first stage wheel 1 and a collection hole 79 formed in the distant piece 12 and collected via the collection path on the still side of the body which is not shown in the drawing.

Figure 5:
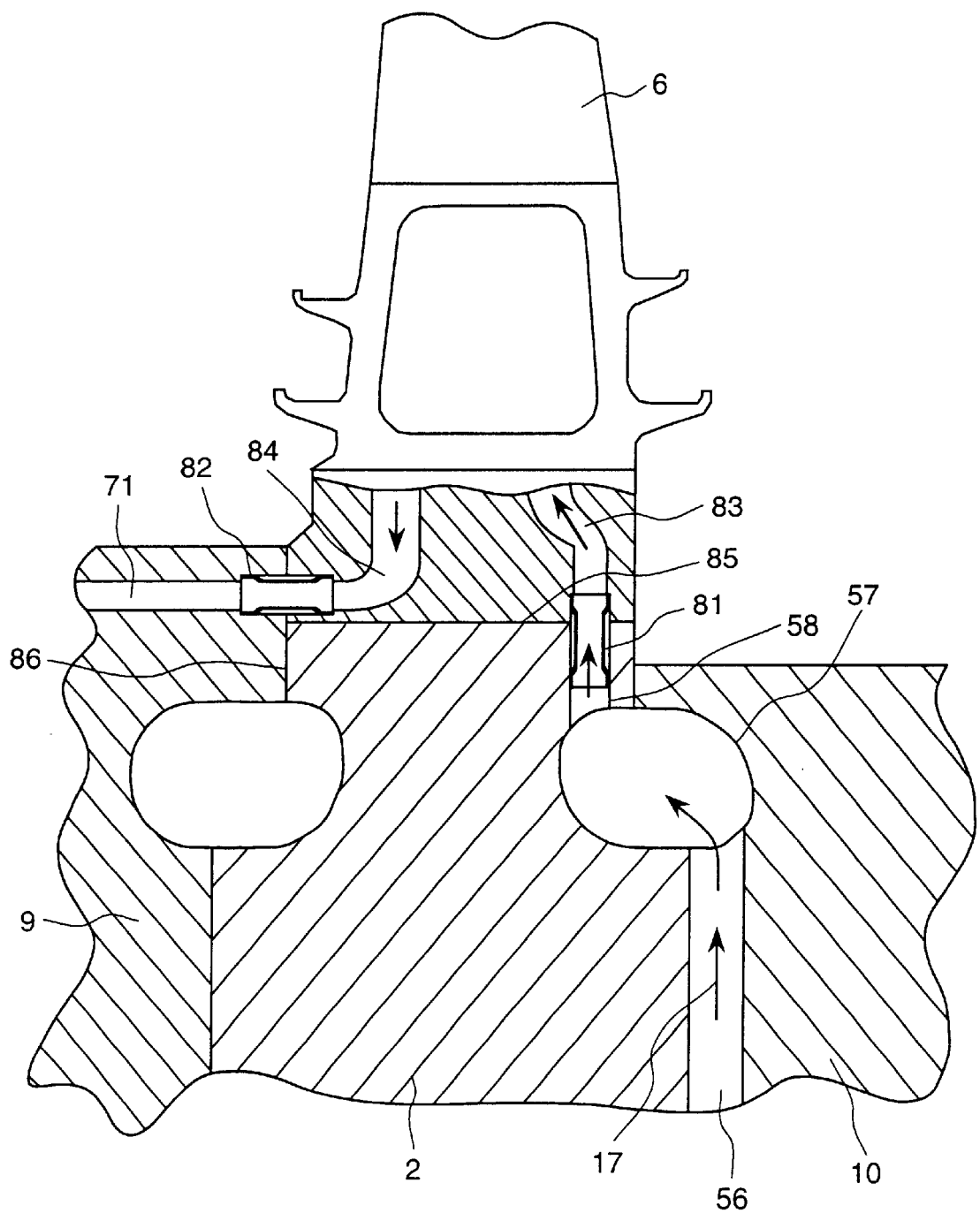
FIG. 5 is an enlarged view of the inlet part and outlet part of cooling air in the second stage moving blades.

FIG. 5 is an enlarged view of the inlet part and outlet part of the cooling air 17 in the second stage moving blades 6. The hole 58 in the radial direction formed on the outer periphery side of the second stage wheel 2 is led to a cooling air supply hole 83 to the second stage moving blades 6. The boundary of the hole 58 in the radial direction and the cooling air supply hole 83 is a junction 85 at the connection where the second stage wheel 2 and the second stage moving blades 6 are just in contact with each other and there is a slight gap in the junction 85. To prevent the cooling air 17 from leaking from the junction 85, the hole 58 in the radial direction and the cooling air supply hole 83 are interconnected and a supply member 81 at the metal fittings covering the junction 85 is fit into them. The construction of each parallel flow cooling air path for the first stage moving blades is similar to the cooling air flow path 58, 81, 83 for the second stage moving blades.

The cooling air 17 after cooling the second stage a moving blades 6 is introduced into the collection hole 71 formed in the outer periphery of the spacer 9 via a cooling air collection hole 84. The boundary of the cooling air collection hole 84 and the collection hole 71 is a boundary 86 at the connection where the second stage moving blades 6 and the spacer 9 are just in contact with each other and there is a slight gap also in the boundary 86. To prevent the cooling air 17 from leaking from the boundary 86, the cooling air collection hole 84 and the collection hole 71 are interconnected and a collection member 82 at the metal fittings covering the boundary 86 is fit into them. The inlet part and outlet part of the cooling air 17 in the first stage moving blades 5 also have a supply member and a collection member having the same constitution.

Meanwhile, since main gas passing through the second stage moving blades does its work in the first stage moving blades, the temperature of main gas in the second stage moving blades 6 is lower than that of the first stage moving blades 5. When the air temperature at the outlet of the combustor is on the level of 1500° C., the difference in the temperature of main gas between the first stage moving blades 5 and the second stage moving blades 6 is more than 200° C. Even if the allowable metal temperature of the first stage moving blades 5 is made higher than that of the second stage moving blades 6 depending on the material characteristics such as the material kind, single crystal, polycrystal, and others, it is impossible to compensate for more than 200° C. of difference in the temperature of main gas by the material and the necessary cooling air amount of the first stage moving blades 1 is more than that of the second stage moving blades 6.

When a constitution that the cooling air 17 can be positively supplied much to the first stage moving blades 5 is used, for example, when the path on the side of the first stage moving blades 5 is formed just widely, the flow path resistance inside the first stage moving blades 5 becomes only large (that is, the cooling air is blocked) and inversely the pressure loss of the cooling air 17 becomes larger than that of the second stage moving blades 6.

As shown in FIG. 2, the pressure loss of the cooling air 17 passing through each flow path from the cavity 25 which is the branch point to the collection hole 74 which is the junction is equal to each other between the side of the first stage moving blades 5 and the side of the second stage moving blades 6, so that when the pressure loss generated on the path on the side of the second stage moving blades 6 other than the inside of the second stage moving blades 6 is adjusted so as to be larger than that on the path on the side of the first stage moving blades 5 in correspondence to that the pressure loss of cooling air inside the first stage moving blades 5 is larger, the cooling air 17 can pass much through the first stage moving blades 5 smoothly.

To increase the pressure loss generated on the path on the side of the second stage moving blades 6, the length of the path on the side of the second stage moving blades 6 is made longer than the length of the path on the side of the first stage moving blades 5 or the sum of minimum sectional areas of a plurality of paths installed on the side of the second stage moving blades 6 is made smaller than the sum of minimum sectional areas of a plurality of paths installed on the side of the first stage moving blades 5. From the viewpoint of the structure, a constitution of adjusting the sectional area can be easier manufactured than a constitution of changing the path length.

Figure 6:
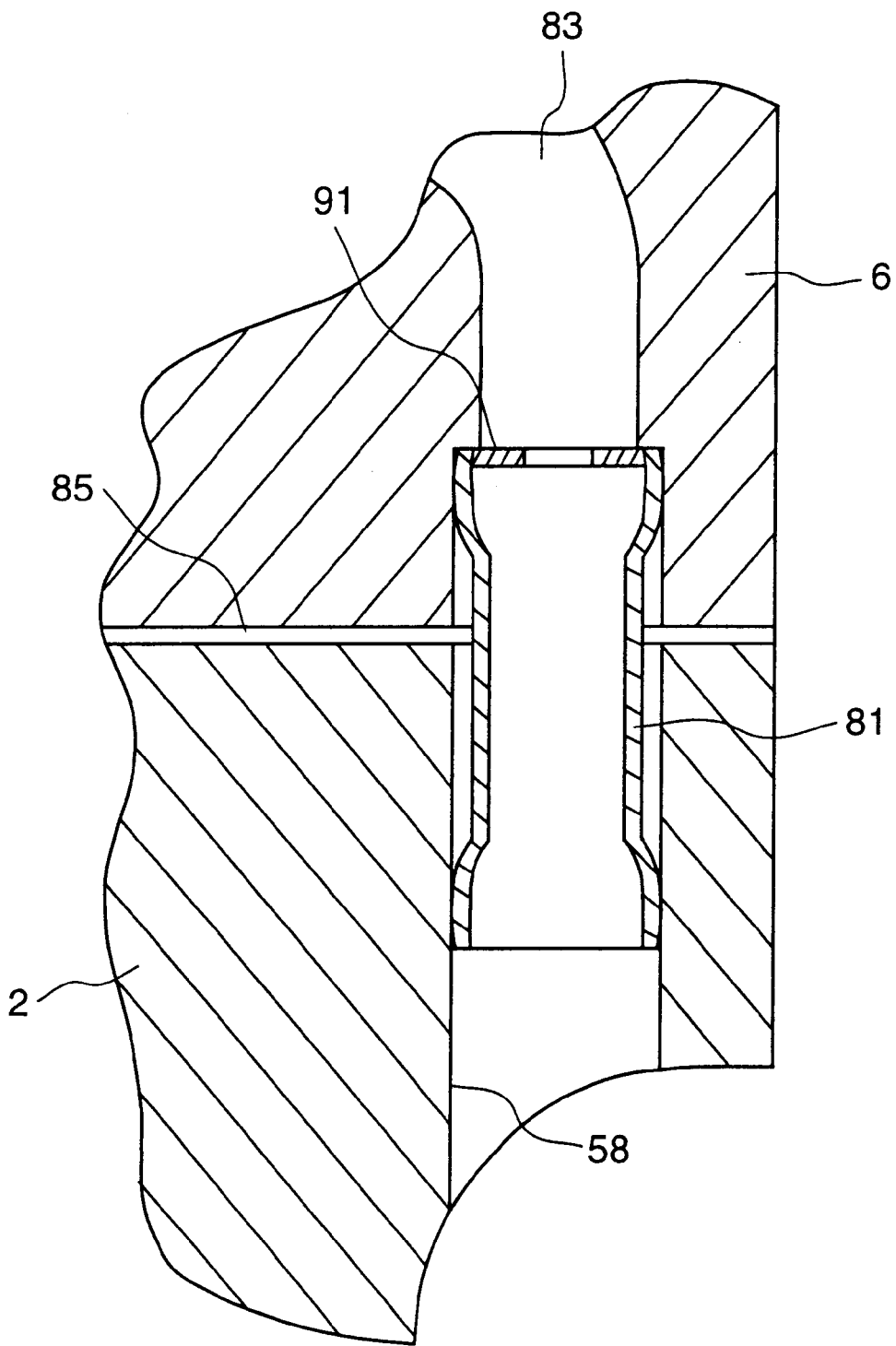
FIG. 6 is an enlarged view of the inlet part of cooling air in the second stage moving blades.
Figure 7:
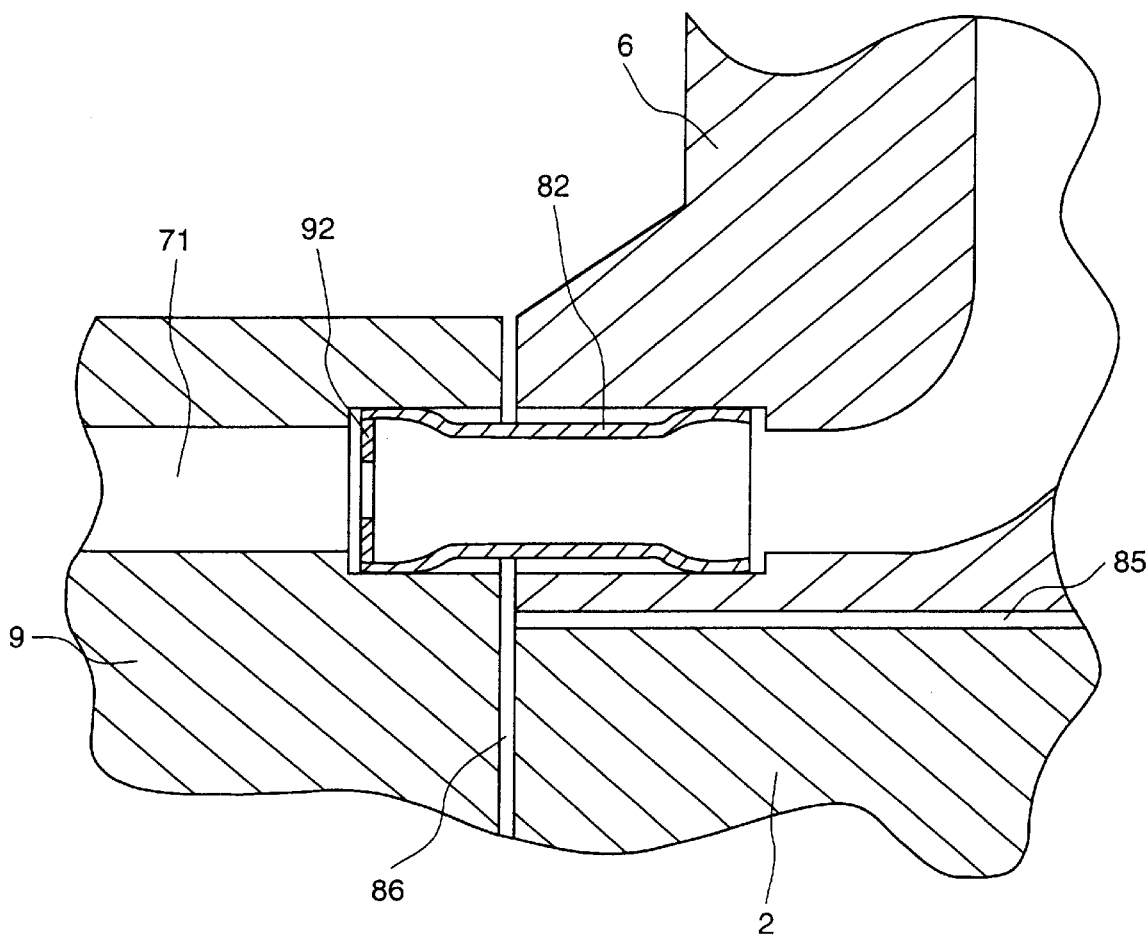
FIG. 7 is an enlarged view of the outlet part of cooling air in the second stage moving blades.

FIG. 6 is an enlarged view of the inlet part of the cooling air 17 in the second stage moving blades 6 shown in FIG. 5. To make the sum of minimum sectional areas of the respective paths on the side of the second stage moving blades 6 smaller than the sum of minimum sectional areas of the respective paths on the side of the first stage moving blades 5, a minimum sectional member 91 is incorporated in the supply member 81. FIG. 7 is an enlarged view of the outlet part of the cooling air 17 in the second stage moving blades 6 shown in FIG. 5. To make the sum of minimum sectional areas of the respective paths on the side of the second stage moving blades 6 smaller than the sum of minimum sectional areas of the respective paths on the side of the first stage moving blades 5, a minimum sectional member 92 is incorporated in the collection member 82. These minimum sectional members 91 and 92 function as limiting plates (or orifice plates) for flowing of the cooling air 17 and according to this embodiment, a configuration that they are incorporated in both of the supply member 81 and the collection member 82 is used. However, even when the minimum member is installed in either of them, it functions sufficiently.

A general turbine has a structure that the moving blades of the turbine can be mounted, demounted, or exchanged without removing the stacking bolts 14 and breaking down the rotor 16. Therefore, the supply member 81 and the collection member 82 are structured so as to be taken out easily by removing the moving blades and the supply member 81 and the collection member 82 can be also mounted, demounted, or exchanged without removing the stacking bolts 14 and breaking down the rotor 16.

Even if the sectional area and resistance of the cooling air supply flow path in the rotor 16, the flow path resistance inside the cooling moving blades, and the sectional area and resistance of the cooling air collection flow path in the rotor are estimated at the design stage and each flow path is designed and manufactured on the basis of it so that an appropriate flow rate flows in the moving blades at each stage, when the gas turbine is actually operated, the metal temperature of each of the first stage moving blades 5 and the second stage moving blades 6 is easily varied and apt to be deviated from the design value, so that the accuracy is limited and it is necessary to adjust the cooling air amount according to the metal temperature of each of the first stage moving blades 5 and the second stage moving blades 6 after assembly and manufacture. When the minimum sectional member 91 is incorporated in the supply member 81 or the minimum sectional member 92 is incorporated in the collection member 82 and the cooling air amount is adjusted by changing the flow path area of the minimum sectional member, without removing the stacking bolts 14 and breaking down and reassembling the rotor 16 requiring troublesome adjustment, the flow rate can be simply adjusted, and the operation time can be shortened greatly, and the cost can be reduced.

When the supply member 81 and the collection member 82 themselves are to be exchanged, or the minimum sectional members 91 and 92 are to be exchanged, or the flow rate is to be adjusted by grinding the flow paths of the minimum sectional members 91 and 92, the supply member 81 and the collection member 82 are excellent in operability because they are small as parts.

Furthermore, by attaching the minimum sectional member 91 to the supply member 81 instead of attaching the minimum sectional member 92 to the collection member 82, the pressure loss is generated by the minimum sectional member 91 before passing through the blades, so that the cooling air pressure in the second stage moving blades 6 lowers. The cooling air leakage amount from cracks and gaps generated in the second stage moving blades 6 becomes smaller in correspondence to the lower cooling air pressure.

Figure 8:
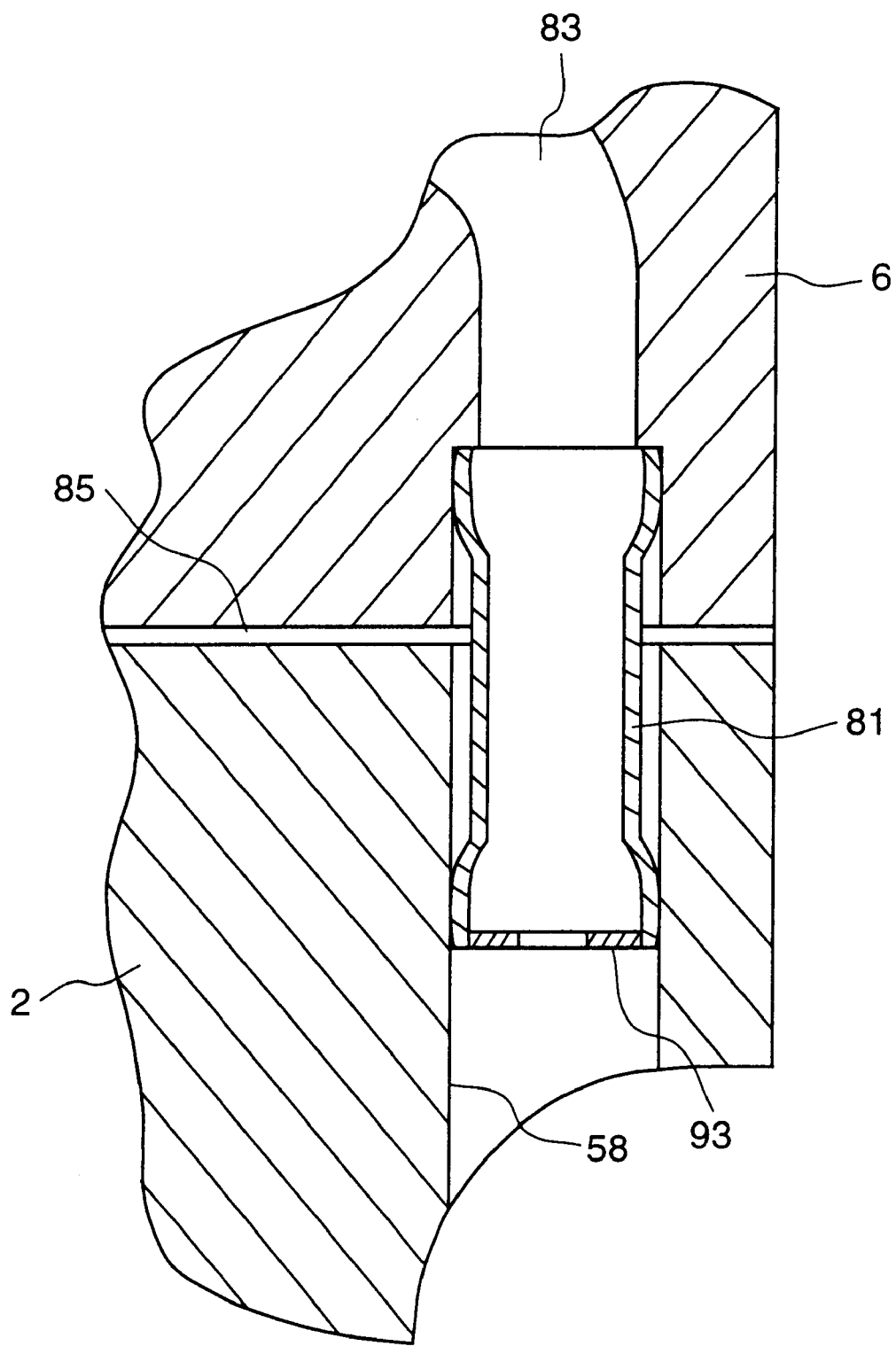
FIG. 8 is an enlarged view when a minimum sectional member is attached to the inlet of a supply member on the upstream side.

As shown in FIG. 8, when a minimum sectional member 93 is attached to the inlet on the upstream side of the supply member 81, the leakage to the junction 85 can be suppressed more.

When the number of supply holes 52 for the second stage moving blades shown in FIG. 3 is made smaller than the number of supply holes 28 for the first stage moving blades and the diameter of the supply holes 52 is made smaller than the diameter of the supply holes 28, the sum of minimum sectional areas of the respective cooling air paths on the side of the second stage moving blades can be also made smaller than the sum of minimum sectional areas of the respective cooling air paths on the side of the first stage moving blades.

Even if the supply member 81 and the collection member 82 are not provided, only the minimum sectional member 91 and the minimum sectional member 92 can be attached and for example, there is a constitution available that a deep facing hole is formed on the same axis as that of the refrigerant flow path from the junction 85 or the boundary 86 and a minimum sectional member having the same outer diameter as that of the hole is fit in. When a constitution that when the moving blades are removed, the minimum sectional member can be easily mounted or demounted is used like this, even if the minimum sectional member is positioned away from the neighborhood of the junction 85 and the boundary 86, the flow rate can be simply adjusted without breaking down the rotor 16.

Furthermore, on the side of the stub shaft 13 shown in FIG. 2, for example, a flow path adjustment mechanism of the cooling air path on the side of the second stage moving blades such as screw type parts for adjusting the flow path by changing the flow path area by changing the screw depth can be attached.

When the flow rate is to be adjusted only by the cooling air path side on the side of the second stage moving blades inside the rotor 16, the cooling air flow rate of the second stage moving blades 6 can be adjusted greatly by the function of the aforementioned adjustment mechanism, that is, the adjustable range (hereinafter referred to as an adjustment margin) is large. However, the adjustment margin of the cooling air flow rate of the first stage moving blades 5 is smaller than that of the second stage moving blades 6 because there is no mechanism for directly adjusting it. If a constitution that not only the flow rate adjustment only by the cooling air path on the side of the second stage moving blades but also the flow rate adjustment can be performed also on the still side of the body before introduced into the rotor 16 before cooling air for the first stage moving blades and cooling air for the second stage moving blades branch is used, the adjustment margin of the cooling air flow rate of the first stage moving blades 5 also can be taken large. Namely, the flow rate of the first stage moving blades is adjusted in flow rate adjustment on the still side of the body and the flow rate of the second stage moving blades is adjusted in flow rate adjustment of the cooling air path on the side of the second stage moving blades in the rotor 16. The constitution of the still side of the body not shown in the drawing is a constitution that a supply pipe of the cooling air 17 and a collection pipe of cooling air are provided.

This embodiment uses a constitution that the supply branch point for supplying a refrigerant to the first stage moving blades and the second stage moving blades and the collection junction of a refrigerant to be collected from the first stage moving blades and the second stage moving blades are provided inside the rotor. However, the application of the present invention is not limited to such a constitution. As long as a constitution that as mentioned above, by making the sum of minimum sectional areas of a plurality of paths installed in parallel with each other for each flow path to be connected to each moving blade stage different for each flow path for each moving blade stage, the refrigerant flow rate distribution is adjusted is used, even if the present invention is applied to a constitution that for example, at least one of the supply branch point and collection junction is installed on the still side of the body and the supply flow inlet or collection exhaust outlet corresponding to each moving blade stage is installed in the rotor and connected to each moving blade stage, the effects of the present invention can be obtained.

The present invention can be applied also to a case that the moving blades of the third and subsequent stages are to be cooled in the future and in this case, so that the sum of minimum sectional areas of the respective paths on the moving blade stage side relatively positioned on the downstream side in the flow direction of main gas is made smaller than the sum of minimum sectional areas of the respective paths on the moving blade stage side relatively positioned on the downstream side, it is desirable to adjust the sectional area of flow path of the minimum sectional member to be incorporated in each supply member.

The aforementioned embodiment is explained on the assumption that the present invention is applied to a gas turbine having an object of using compressed air as a refrigerant and taking out rotational axis force. However, the present invention is not limited to it. For example, the present invention can be applied to a gas turbine having a constitution that an exhaust heat collection boiler is installed in the gas turbine and vapor generated by it is used for a refrigerant, a constitution that nitrogen gas generated as a by-product when the gas turbine is used to supply power of a chemical refining plant is used as a refrigerant, or a constitution that exhaust gas is used for jet thrust.

As explained above, according to the present invention, for the first stage moving blades and second stage moving blades which are greatly different in the necessary refrigerant flow rate, a refrigerant can be supplied and collected at an appropriate refrigerant flow rate distribution respectively.

According to the present invention, the refrigerant flow rate to each stage moving blades can be adjusted simply without breaking down the rotor.

Furthermore, according to the present invention, using a supply member or a collection member to be installed so as to suppress leakage of a refrigerant, the refrigerant flow rate can be adjusted.

According to the present invention, the adjustment margin of the refrigerant flow rate of not only the second stage moving blades but also the first stage moving blades can be increased.

What is claimed is:

1. A closed circuit blade cooled turbine having moving blades at a plurality of stages arranged in a flowing direction of a main gas of a gas turbine and fixed to the outer periphery of a rotor, supplying a refrigerant at least to the first stage and second stage moving blades from an upstream side among said moving blades at said plurality of stages, and collecting said refrigerant after cooling without discharging it into the main gas, wherein said turbine, inside said rotor, has a branch point of a refrigerant supply path for said first stage moving blades and a refrigerant supply path for said second stage moving blades and a junction of a refrigerant collection path for said first stage moving blades and a refrigerant collection path for said second stage moving blades, said refrigerant supply path and said refrigerant collection path for said first stage moving blades and said refrigerant supply path and said refrigerant collection path for said second stage moving blades have a plurality of parallel flow paths for refrigerant supply and a plurality of parallel flow paths for refrigerant collection to be connected to said respective refrigerant paths in said moving blades at each said stage between said branch point and said junction, first metal fittings having an internal flow path are arranged at any part of said plurality of parallel flow paths for refrigerant supply for said first stage moving blades, said plurality of parallel flow paths for refrigerant collection, and said respective refrigerant flow paths in said first stage moving blades, second metal fittings having an internal flow path are arranged at any part of said plurality of parallel flow paths for refrigerant supply for said second stage moving blades, said plurality of parallel flow paths for refrigerant collection, and said respective refrigerant flow paths in said second stage moving blades, and the sum of sectional areas of said internal flow paths of said second metal fittings is smaller than the sum of sectional areas of said internal flow paths of said first metal fittings.

2. A closed circuit blade cooled turbine according to claim 1 wherein third metal fittings having an internal flow path are arranged at any part of said plurality of parallel flow paths for refrigerant supply for said second stage moving blades, said plurality of parallel flow paths for refrigerant collection, and said respective refrigerant flow paths in said second stage moving blades, said third metal fittings having means for changing an internal flow resistance.

3. A closed circuit blade cooled turbine according to claim 1 wherein at any parts in the neighborhood of connections of said plurality of parallel flow paths for refrigerant supply for said second stage moving blades and said respective refrigerant flow paths in said second stage moving blades and in the neighborhood of connections of said plurality of parallel flow paths for refrigerant collection for said second stage moving blades and said respective refrigerant flow paths in said second stage moving blades, third metal fittings having an internal flow path are arranged, and said third metal fitting has means for changing an internal flow resistance.

4. A closed circuit blade cooled turbine according to claim 1, wherein said first and second metal fittings are a supply member or a collection member to be installed so as to suppress leakage of a refrigerant from gaps between said rotor and said first stage moving blades and said second stage moving blades.

5. A closed circuit blade cooled turbine having moving blades at a plurality of stages arranged in a flowing direction of a main gas of a gas turbine and fixed to the outer periphery of a rotor, supplying a refrigerant at least to first stage and second stage moving blades from an upstream side among said moving blades at said plurality of stages, and collecting said refrigerant after cooling without discharging it into the main gas, wherein said turbine, inside said rotor, has a branch point of a refrigerant supply path for said first stage moving blades and a refrigerant supply path for said second stage moving blades and a junction of a refrigerant collection path for said first stage moving blades and a refrigerant collection path for said second stage moving blades, said refrigerant supply path and said refrigerant collection path for said first stage moving blades and said refrigerant supply path and said refrigerant collection path for said second stage moving blades have a plurality of parallel flow paths for refrigerant supply and a plurality of parallel flow paths for refrigerant collection to be connected to said respective refrigerant paths in said moving blades at each said stage between said branch point and said junction, and means for changing an internal flow resistance is installed at any part of said plurality of parallel flow paths for refrigerant supply for said second stage moving blades, said plurality of parallel flow paths for refrigerant collection, and said respective refrigerant flow paths in said second stage moving blades, said means for changing an internal flow resistance comprising a replaceable member having a constant flow resistance.

6. A closed circuit blade cooled turbine having moving blades at a plurality of stages arranged in a flowing direction of a main gas of a gas turbine and fixed to the outer periphery of a rotor, supplying a refrigerant at least to first stage and second stage moving blades from an upstream side among said moving blades at said plurality of stages, and collecting said refrigerant after cooling without discharging it into the main gas, wherein said turbine, inside said rotor, has a branch point of a refrigerant supply path for said first stage moving blades and a refrigerant supply path for said second stage moving blades and a junction of a refrigerant collection path for said first stage moving blades and a refrigerant collection path for said second stage moving blades, said refrigerant supply path and said refrigerant collection path for said first stage moving blades and said refrigerant supply path and said refrigerant collection path for said second stage moving blades have a plurality of parallel flow paths for refrigerant supply and a plurality of parallel flow paths for refrigerant supply and a plurality of parallel flow paths for refrigerant collection to be connected to said respective refrigerant paths in said moving blades at each said stage between said branch point and said junction, at any parts in th e neighborhood of connections of said plurality of parallel flow paths for refrigerant supply for said first stage moving blades and said respective refrigerant flow paths in said first stage moving blades and in the neighborhood of connections of said plurality of parallel flow paths for refrigerant collection for said first stage moving blades and said respective refrigerant flow paths in said first stage moving blades, first metal fittings having an internal flow path are arranged, at any parts in the neighborhood of connections of said plurality of parallel flow paths for refrigerant supply for said second stage moving blades and said respective refrigerant flow paths in said second stage moving blades and in the neighborhood of connections of said plurality of parallel flow paths for refrigerant collection for said second stage moving blades and said respective refrigerant flow paths in said second stage moving blades, second metal fittings having an internal flow path are arranged, and the sum of sectional areas of said internal flow paths of said second metal fittings is always smaller than the sum of sectional areas of said internal flow paths of said first metal fittings.

7. A closed circuit blade cooled turbine having moving blades at a plurality of stages arranged in a flowing direction of a main gas of a gas turbine and fixed to the outer periphery of a rotor, supplying a refrigerant at least to the first stage and second stage moving blades from an upstream side among said moving blades at said plurality of stages, and collecting said refrigerant after cooling without discharging it into the main gas, wherein said turbine, inside said rotor, has a branch point of a refrigerant supply path for said first stage moving blades and a refrigerant supply path for said second stage moving blades and a junction of a refrigerant collection path for said first stage moving blades and a refrigerant collection path for said second stage moving blades, said refrigerant supply path and said refrigerant collection path for said first stage moving blades and said refrigerant supply path and said refrigerant collection path for said second stage moving blades have a plurality of parallel flow paths for refrigerant supply and a plurality of parallel flow paths for refrigerant collection to be connected to said respective refrigerant paths in said moving blades at each said stage between said branch point and said junction, and at any parts in the neighborhood of connections of said plurality of parallel flow paths for refrigerant supply for said second stage moving blades and said respective refrigerant flow paths in said second stage moving blades and in the neighborhood of connections of said plurality of parallel flow paths for refrigerant collection for said second stage moving blades and said respective refrigerant flow paths in said second stage moving blades, means for changing an internal flow resistance is installed, said means for changing an internal flow resistance comprising a replaceable member having a constant flow resistance.

8. A closed circuit blade cooled turbine having moving blades at a plurality of stages arranged in a flowing direction of a main gas of a gas turbine and fixed to the outer periphery of a rotor, supplying a refrigerant at least to first stage and second stage moving blades from an upstream side among said moving blades at said plurality of stages, and collecting said refrigerant after cooling without discharging it into the main gas, wherein said turbine, inside said rotor, has a branch point of a refrigerant supply path for said first stage moving blades and a refrigerant supply path for said second stage moving blades and a junction of a refrigerant collection path for said first stage moving blades and a refrigerant collection path for said second stage moving blades, and said refrigerant supply path and said refrigerant collection path for said first stage moving blades and said refrigerant supply path and said refrigerant collection path for said second stage moving blades have a plurality of parallel flow paths for refrigerant supply and a plurality of parallel flow paths for refrigerant collection to be connected to said respective refrigerant paths in said moving blades at each said stage between said branch point and said junction, and the sum of minimum sectional areas of any parts of said plurality of parallel flow paths for refrigerant supply for said second stage moving blades and said plurality of parallel flow paths for refrigerant collection and said respective refrigerant flow paths in said second stage moving blades is always smaller than the sum of minimum sectional areas of any parts of said plurality of parallel flow paths for refrigerant supply for said first stage moving blades and said plurality of parallel flow paths for refrigerant collection and said respective refrigerant flow paths in said first stage moving blades, and which further includes, in said refrigerant flow path at least on one of a still side which is a supply source of said refrigerant and a still side which is a collection destination of said refrigerant, means for changing a flow resistance.

* * * * *